US006064441A

United States Patent [19]

Okamoto

[11] Patent Number: 6,064,441

[45] Date of Patent: May 16, 2000

[54] RECEIVING METHOD AND APPARATUS IN WHICH RECEIVED BROADCASTING DATA READ OUT OF A MEMORY CONTAINS MARKS REPRESENTING A PARTITION OF THE DATA

[75] Inventor: Tadashi Okamoto, Kanagawa, Japan

[73] Assignee: Sony Corporation, Tokyo, Japan

[21] Appl. No.: 09/076,647

[22] Filed: May 12, 1998

[30] Foreign Application Priority Data

May 13, 1997 [JP] Japan .................................. 9-122150

[51] Int. Cl.[7] ...................................................... H04N 7/08

[52] U.S. Cl. .......................... 348/485; 348/460; 386/104

[58] Field of Search .................................... 348/485, 484, 348/468, 10, 460, 462, 714, 725, 738; 386/96, 100, 104

[56] References Cited

U.S. PATENT DOCUMENTS 4,750,206 6/1988 Schotz .................................... 348/485
4,855,827 8/1989 Best ........................................ 348/485
5,010,499 4/1991 Yee .......................................... 348/10
5,191,615 3/1993 Aldava .................................... 348/485
5,375,160 12/1994 Guidon et al. .......................... 348/468
5,585,858 12/1996 Harper et al. .......................... 348/485
5,737,034 4/1998 Rhee ...................................... 348/485
5,808,689 9/1998 Small ..................................... 348/462

*Primary Examiner*—Victor R. Kostak
*Attorney, Agent, or Firm*—Jay H. Maioli

[57] ABSTRACT

An apparatus for receiving broadcasting signals includes a tuner for receiving a digital audio broadcasting signal, a channel decoder for obtaining information data based on the digital audio broadcasting signal received by the tuner, a source decoder for causing the information data obtained from the channel decoder to be subjected to a decoding processing to produce a digital audio signal and associated data accompanying the digital audio signal, a random access memory in which the associated data are stored and from which the associated data stored therein are read, and a control unit operative to store a selected part of the associated data obtained from the source decoder, which has predetermined quantity of data, in the random access memory, to read the selected part of the associated data stored in the random access memory therefrom and to extract a specific portion of the associated data from the selected part of the associated data read from the random access memory.

18 Claims, 4 Drawing Sheets

RECEIVING METHOD AND APPARATUS IN WHICH RECEIVED BROADCASTING DATA READ OUT OF A MEMORY CONTAINS MARKS REPRESENTING A PARTITION OF THE DATA

BACKGROUND OF THE INVENTION

1. Field of the Invention

The present invention relates to an apparatus for receiving broadcasting signals, a method of writing data in and/or reading data from a memory device in a broadcasting signal receiving apparatus and an apparatus for receiving broadcasting signals and recording signals based on the received broadcasting signal. The present invention is directed to an improvement in a broadcasting signal receiving apparatus operative to receive a digital audio broadcasting signal for obtaining a reproduced audio signal based on the digital audio broadcasting signal received thereby and as occasion demands to record the reproduced audio signal on a recording medium, an improvement in a method of writing data in a memory device and/or reading the data stored in the memory device therefrom, and an improvement in a signal receiving and recording apparatus operative to receive a digital audio broadcasting signal for obtaining a reproduced audio signal based on the digital audio broadcasting signal received thereby and recording signals containing the reproduced audio signal on a recording medium.

2. Description of the Prior Art

Although an analog audio broadcasting system which includes an amplitude-modulated (AM) audio broadcasting system in which audio signals are transmitted in the form of an AM audio information signal and a frequency-modulated (FM) audio broadcasting system in which audio signals are transmitted in the form of a FM audio information signal, has been put to practical use for a long time in the field of audio broadcasting, there has been recently proposed to introduce a digital audio broadcasting system in which audio signals are transmitted in the form of a digital audio information signal for the purpose of improving quality of audio information transmitted or received in the system. Especially, in the European Continental, the digital audio broadcasting system called "DAB" has been already put to practical use in some countries.

The digital audio information signal transmitted from a broadcasting station under the digital audio broadcasting system is called a digital audio broadcasting signal. The digital audio broadcasting signal carries not only audio information data forming a digital audio signal but also service information data representing service information, such as weather forecast, traffic information and so on, and further carries control information data which are necessitated for reproducing the digital audio signal based on the audio information data and the service information based on the service information data on the receiving side. Each of the audio information data and service information data contain usually various kinds of program information data representing program information of different kinds.

Each of the audio information data and service information data contained in the digital audio broadcasting signal are transmitted in the form of a series of unit segments each having a time duration of, for example, 24 ms and constituting a logical frame. The logical frame of the audio information data constitutes an audio frame which includes audio data representing the program information and program associated data (PAD) which is related to the program information represented by the audio data and provided to follow the audio data. The program associated data represent, in the form of literal information, information of content of the related program information, for example, in the case where the related program information is music information, the name of a composer, the name of a music, the title of recording media in which the audio data are stored and so on.

Such a digital audio broadcasting signal as described above is received by use of a digital audio broadcasting signal receiver. In the digital audio broadcasting signal receiver, each of digital audio broadcasting signals transmitted respectively from a plurality of broadcasting stations is received selectively through a tuning operation by a tuner and the received digital audio broadcasting signal is subjected to a demodulation and decoding processing in a channel decoder and subjected further to a data selection processing in a program selector so as to produce the service information data and audio information data. Then, the audio information data obtained from the program selector are subjected to a decoding processing in a source decoder so that the audio data forming the digital audio signal are reproduced and the program associated data are obtained, and the service information data obtained from the program selector are subjected to a decoding processing in a decoder so that reproduced service data are obtained. A reproduced audio signal is obtained based on the audio data forming the digital audio signal from the source decoder.

The reproduced audio signal thus obtained in the digital audio broadcasting signal receiver is generally high in its quality and is often not only supplied directly to a speaker for reproducing sound but also recorded on an appropriate recording medium to be preserved. When the reproduced audio signal obtained in the digital audio broadcasting signal receiver is recorded on the recording medium to be preserved, it is desirable that the program associated data related to the reproduced audio signal, which are obtained also in the digital audio broadcasting signal receiver, are recorded on thee recording medium to accompany the reproduced audio signal because the program associated data recorded on the recording medium to accompany the reproduced audio signal are convenient for identifying the reproduced audio signal or recognizing the contents of the reproduced audio signal on the occasion of reading of the reproduced audio signal from the recording medium.

When the reproduced audio signal obtained in the digital audio broadcasting signal receiver are recorded on the recording medium to be accompanied with the program associated data related thereto, it is necessary to derive the program associated data from the digital audio broadcasting signal receiver and store the same temporarily in a memory device. Since the quantity of data of the program associated data obtained in the digital audio broadcasting signal receiver to be related to each program information is relatively large usually, it is required for the memory device, in which the program associated data are stored, to have relatively large memory capacity, and therefore, an expensive device would be used as the memory device.

Further, since the information represented by the program associated data related to each program information represented by the reproduced audio signal contains not only information useful to a user who wants to derive the reproduced audio signal from the recording medium and obtain reproduced sound based on the reproduced audio signal but also information unnecessary to the user, the efficiency of data processing is reduced when the whole program associated data are stored in the memory device to be recorded on the recording medium.

OBJECTS AND SUMMARY OF THE INVENTION

Accordingly, it is an object of the present invention to provide an apparatus for receiving broadcasting signals, by which a digital audio broadcasting signal is received and a reproduced audio signal is obtained based on the received digital audio broadcasting signal, and which avoids the aforementioned disadvantages encountered with the prior art.

Another object of the present invention is to provide an apparatus for receiving broadcasting signals, by which a digital audio broadcasting signal is received and a reproduced audio signal is obtained based on the received digital audio broadcasting signal, and in which a part of program associated data related to each program information represented by the reproduced audio signal, which represents information useful to a user, can be stored temporarily in and read from a memory device, which has relatively small memory capacity, with improved data processing efficiency.

A further object of the present invention is to provide an improved method of writing data in a memory device and/or reading the data stored in the memory device therefrom in a broadcasting signal receiving apparatus, by which a digital audio broadcasting signal is received, various data obtained based on the received digital audio broadcasting signal are processed, and a reproduced audio signal is obtained based on the processed data.

A still further object of the present invention is to provide an apparatus for receiving and recording broadcasting signals, by which a digital audio broadcasting signal is received, a reproduced audio signal is obtained based on the received digital audio broadcasting signal and signals continuing the reproduced audio signal obtained based on the received digital audio broadcasting signal are recorded on a record medium, and in which a part of program associated data related to each program information represented by the reproduced audio signal, which represents information useful to a user, can be stored temporarily in or read from a memory device, which has relatively small memory capacity, with improved data processing efficiency, and the part of program associated data stored temporarily in the memory device can be recorded on the recording medium together with the reproduced audio signal.

According to the present invention, there is provided an apparatus for receiving broadcasting signals, which comprises a tuning portion for receiving selectively digital audio broadcasting signals, a first decoding portion for obtaining information data based on the digital audio broadcasting signal received by the tuning portion, a second decoding portion for causing the information data obtained from the first decoding portion to be subjected to a decoding processing to produce a digital audio signal and associated data accompanying the digital audio signal, a memory portion in which the associated data are stored and from which the associated data stored therein are read, and an operation control portion operative to store a selected part of the associated data obtained from the second decoding portion, which has predetermined quantity of data, in the memory portion, to read the selected part of the associated data stored in the memory portion therefrom and to extract a specific portion of the associated data from the selected part of the associated data read from the memory portion.

In an embodiment of apparatus for receiving broadcasting signals according to the present invention, the operation control portion is operative to extract a portion of the associated data which represents information useful to a user from the selected part of the associated data read from the memory portion as the specific portion of the associated data.

There is also provided, according to the present invention, a method of writing data in and/or reading data from a memory device in a broadcasting signal receiving apparatus, which comprises the steps of receiving selectively digital audio broadcasting signals, obtaining information data based on the digital audio broadcasting signal received at the receiving step, causing the information data obtained based on the digital audio broadcasting signal to be subjected to a decoding processing to produce a digital audio signal and associated data accompanying the digital audio signal, picking out the associated data, storing a selected part of the associated data picked out, which has predetermined quantity of data from the beginning of the associated data, in a memory portion, reading the selected part of the associated data from the memory portion, extracting a specific portion of the associated data from the selected part of the associated data read from the memory portion.

Further, according to the present invention, there is provided an apparatus for receiving broadcasting signals and recording signals based on the received broadcasting signal, which comprises a tuning portion for receiving selectively digital audio broadcasting signals, a first decoding portion for obtaining information data based on the digital audio broadcasting signal received by the tuning portion, a second decoding portion for causing the information data obtained from the first decoding portion to be subjected to a decoding processing to produce a digital audio signal and associated data accompanying the digital audio signal, a memory portion in which the associated data are stored and from which the associated data stored therein are read, an operation control portion operative to store a selected part of the associated data obtained from the second decoding portion, which has predetermined quantity of data, in the memory portion, to read the selected part of the associated data stored in the memory portion therefrom and to extract a specific portion of the associated data from the selected part of the associated data read from the memory portion, and a signal recording portion operative to produce a recording associated data based on the specific portion of the associated data extracted by the operation control portion and to record the recording associated data on a recording medium.

In the apparatus for receiving broadcasting signals constituted as mentioned above in accordance with the present invention, under a condition wherein the digital audio signal and the associated data accompanying the digital audio signal are obtained from the second decoding portion, the selected part of the associated data obtained from the second decoding portion, which has predetermined quantity of data, is stored in the memory portion, then the selected part of the associated data stored in the memory portion is read from the memory portion and the specific portion of the associated data is extracted from the selected part of the associated data read from the memory portion by means of operations of the operation control portion. Accordingly, the selected part of the associated data related to each program information represented by a reproduced audio signal based on the digital audio signal, which includes, for example, a portion of the associated data which represents information useful to a user, can be stored temporarily in or read from the memory device, which is able to have relatively small memory capacity, with improved data processing efficiency.

Further, in the apparatus for receiving broadcasting signals and recording signals based on the received broadcasting signal constituted as mentioned above in accordance with the present invention, under a condition wherein the digital audio signal and the associated data accompanying the digital audio signal are obtained from the second decoding portion, the selected part of the associated data obtained from the second decoding portion, which has predetermined quantity of data, is stored in the memory portion, the selected part of the associated data stored in the memory portion is read from the memory portion, the specific portion of the associated data is extracted from the selected part of the associated data read from the memory portion, and the recording associated data based on the specific portion of the associated data are recorded on a recording medium by means of operations of the operation control portion. Accordingly, the selected part of the associated data related to each program information represented by a reproduced audio signal based on the digital audio signal, which represents, for example, information useful to a user, can be stored temporarily in or read from the memory device, which is able to have relatively small memory capacity, with improved data processing efficiency, and the specific portion of the associated data extracted from the selected part of the associated data stored temporarily in the memory device, can be recorded on a recording medium together with the reproduced audio signal.

The above, and other objects, features and advantages of the present invention will be become apparent from the following detailed description taken in conjunction with the accompanying drawings.

DESCRIPTION OF THE PREFERRED EMBODIMENTS

Figure 1:
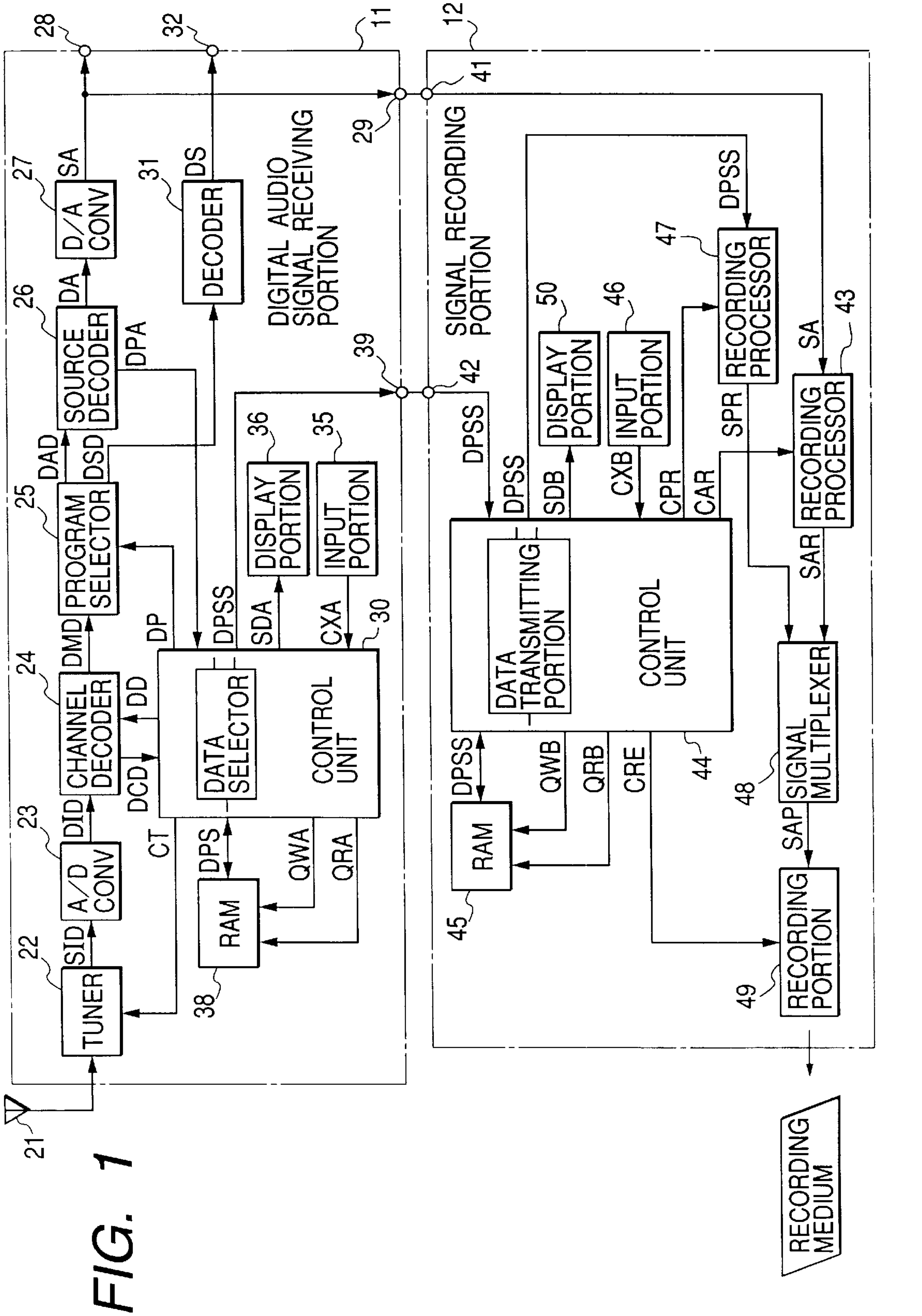
FIG. 1 is a schematic block diagram showing an embodiment of apparatus for receiving broadcasting signals according to the present invention, to which an embodiment of method of writing data in and/or reading data from a memory device in a broadcasting signal receiving apparatus according to the present invention is applied, and showing also an embodiment of apparatus for receiving broadcasting signals and recording signals based on the received broadcasting signal according to the present invention.

FIG. 1 shows an embodiment of apparatus for receiving broadcasting signals according to the present invention, to which an embodiment of method of writing data in and/or reading data from a memory device in a broadcasting signal receiving apparatus according to the present invention is applied, and an embodiment of apparatus for receiving broadcasting signals and recording signals based on the received broadcasting signal according to the present invention.

Referring to FIG. 1, a digital audio signal receiving portion 11 and a signal recording portion 12 are provided.

In the digital audio signal receiving portion 11, a digital audio broadcasting signal transmitted from a broadcasting station and having reached to a receiving antenna 21 is received through a tuning operation by a tuner 22.

The digital audio broadcasting signal received by the tuner 22 is a modulated wave signal obtained by modulating a carrier wave signal with digital data in accordance with the Orthogonal Frequency Division Multiplexing (OFDM) system and the digital data is composed of a series of frame units, each of which is called a transmission frame.

Figures 2A, 2B, 2C, 2D, 2E:
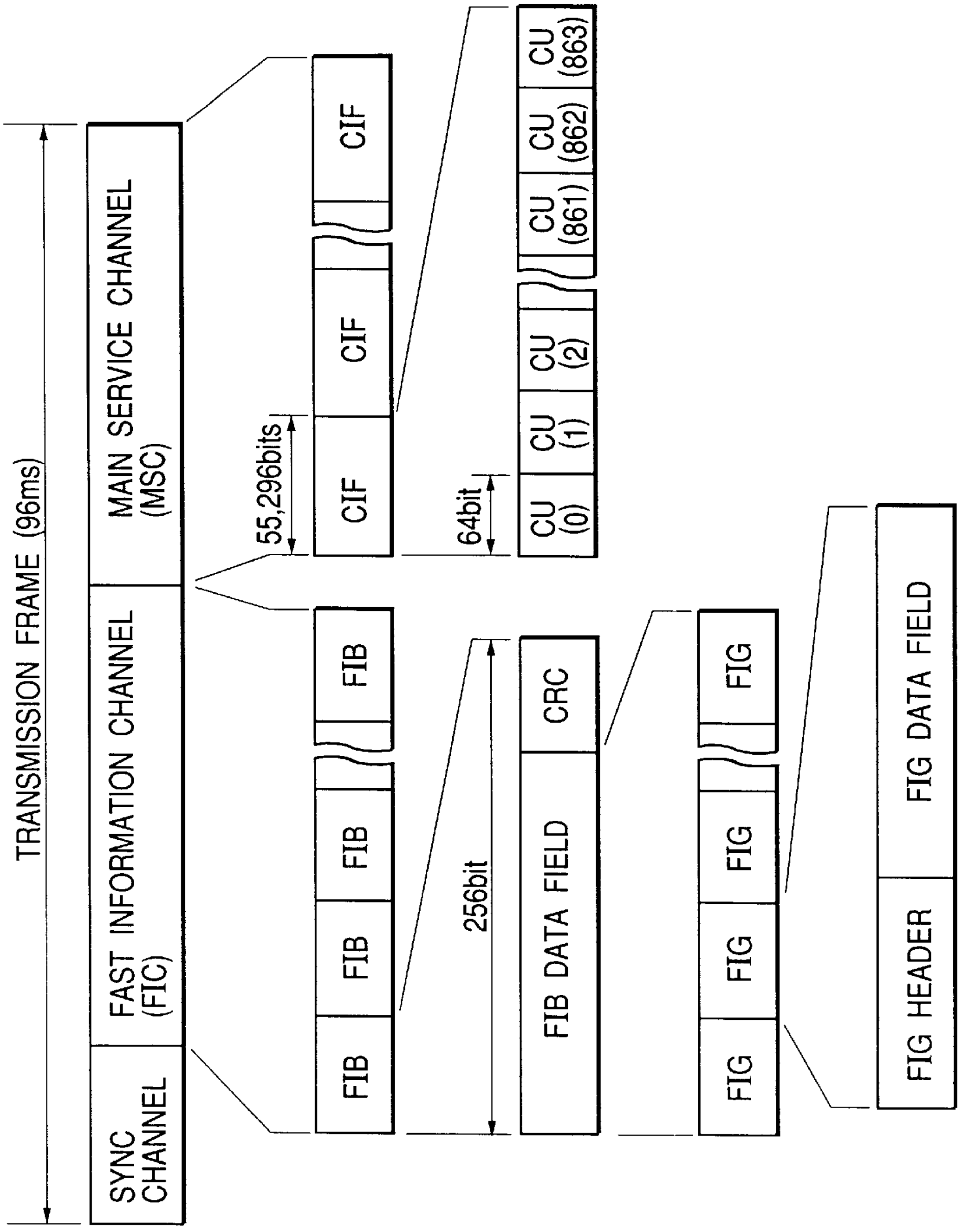
FIGS. 2A to 2E are illustrations showing data formats used for explaining a digital audio broadcasting signal received by the embodiment shown in FIG. 1.

The transmission frame has a time duration of, for example, 96 ms and contains three portions of a synchronous channel, a fast information channel (FIC) and a main service channel (MSC), as shown in FIG. 2A. The MSC is composed of a series of common interleaved frames (CIFs), as shown in FIG. 2B. Each of the CIFs corresponds to 55,296 bits and is composed of a series of 864 capacity units (CUs) identified with numbers (0) to (863), respectively, as shown in FIG. 2C. Each of the capacity units forms unit data corresponding to 64 bits. The MSC thus constituted transmits audio information and service information.

The FIC is composed of series of first information blocks (FIBs), as shown in FIG. 2B. Each of the FIBs corresponds to 256 bits and contains a couple of portions of an FIB data field and an error checking word CRC (Cyclic Redundancy Check), as shown in FIG. 2C. The FIB data field is composed of a series of first information groups (FIGS), as shown in FIG. 2D. Each of the FIGS contains a couple of portions of a FIG header and an FIG data field, as shown in FIG. 2E. The FIC thus formed transmits control information, such as multiplex configuration information (MCI) and other information.

The tuning operation by the tuner 22 is performed in response to a tuning control signal CT supplied from a control unit 30 forming an operation control portion. In the tuner 22, the received digital audio broadcasting signal is subjected to an amplifying processing and a frequency-converting processing to produce an intermediate frequency (IF) signal SID. The IF signal SID is supplied to an analog to digital (A/D) convertor 23. A digital IF signal DID corresponding to the IF signal SID is obtained from the A/D convertor 23 to be supplied to a channel decoder 24.

In the channel decoder 24, the digital IF signal DID is subjected to various signal processing including a quadrature demodulation processing, a signal conversion processing for converting a time domain signal to a frequency domain signal and so on, so as to produce control information data which represent control information containing the MCI transmitted by the FIC, audio information data which represent audio information transmitted by the MSC and service information data which represent service information transmitted by the MSC. Further, in the channel decoder 24, the audio information data and service information data are subjected respectively to program selection processing, audio program data and service program data each representing selected program information and obtained by the program selection processings are subjected respectively to time de-interleaving arrangements, and the control information data and the time de-interleaved audio information data and service information data are subjected respectively to error correction processings. Then, the control information data DCD subjected to the error correction processing are supplied from the channel decoder 24 to the control unit 30 and program information data DMD containing the audio information data and service information data each subjected to the error correcting processing is supplied from the channel decoder 24 to a program selector 25.

In the program selector 25, audio program data DAD based on the program information data DMD or service program data DSD based on the program information data DMD are obtained. The audio program data DAD derived from the program selector 25 are supplied to a source decoder 26. In the source decoder 26, the audio program data DAD are subjected to a high efficiency decoding by which data suppressed in accordance with a high efficiency coding are expanded to produce decoded audio data DA based on the audio program data DAD. The audio data DA decoded constitute a digital audio signal representing selected program information. Further, program associated data DPA which are contained in the audio program data DAD are obtained from the source decoder 26 to be supplied to the control unit 30.

Figure 3:
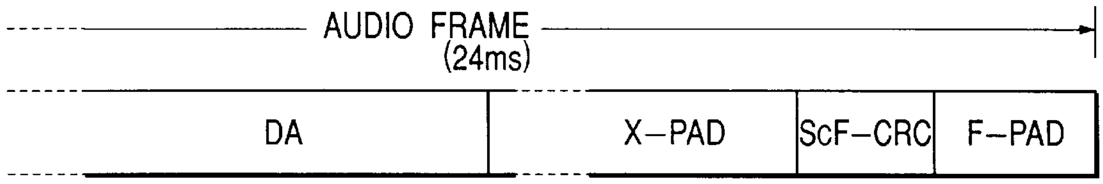
FIG. 3 is an illustration showing a data format used for explaining audio program data obtained by the embodiment shown in FIG. 1.

The program associated data DPA contained in the audio program data DAD contain, for example, variable program associated data X-PAD successive to the audio data DA in an audio frame constituted by the audio program data DAD and fixed program associated data F-PAD, as shown in FIG. 3. ScF-CRC in the audio frame shown in FIG. 3 is an error detecting word for scale factor data contained in the audio frame (not shown in FIG. 3).

The program associated data DPA obtained from the source decoder 26 represent, in the form of literal information, information of contents of program information represented by the audio data DA to which the program associated data DPA is related, for example, in the case where the related program information is music information, the name of a composer, the name of a music, the title of recording media in which the music information is stored and so on.

The decoded audio data DA obtained from the source decoder 26 to constitute the digital audio signal are supplied to a digital to analog (D/A) convertor 27 to be converted to an analog sound signal forming a reproduced audio signal SA corresponding to the decoded audio data DA. The reproduced audio signal SA is derived from the D/A convertor 27 to output terminals 28 and 29.

The service program data DSD derived from the program selector 25 are supplied to a decoder 31. In the decoder 31, the service program data DSD are subjected to a decoding processing to produce reproduced service data DS based on the service program data DSD. The reproduced service data DS are derived from the decoder 31 to an output terminal 32.

The control unit 30 is operative to produce control data DD and DP based on the control information data DCD from the channel decoder 24, a command signal CXA supplied from an input portion 35 in response to manual operations thereto and so on and to supply the channel decoder 24 with the control data DD and the program selector 25 with the control data DP for controlling the operations of the channel decoder 24 and program selector 25. The control unit 30 is operative also to produce the tuning control signal CT based on the command signal CXA supplied from the input portion 35. The operational condition of the control unit 30 in response to the command signal CXA from the input portion 35 is displayed on a display portion 36 to which a displaying signal SDA is supplied from the control unit 30.

Further, in the control unit 30, the program associated data DPA from the source decoder 26 is supplied to a data selector contained in the control unit 30. In the data selector, a selected part of the program associated data DPA, which has predetermined quantity of data, is picked out as selected program associated data DPS. Then, the selected program associated data DPS obtained from the data selector in the control unit 30 are supplied to a random access memory (RAM) 38.

The selected part of the program associated data DPA, which has the predetermined quantity of data and picked out in the data selector in the control unit 30 as the selected program associated data DPS, are constituted by, for example, an initial part of the program associated data DPA, which has the predetermined quantity of data, for example, the quantity of data corresponding to 128 characters or less. That is, in such a case, the initial part of the program associated data DPA, which has the quantity of data corresponding to 128 characters or less is picked out as the selected program associated data DPS to be supplied to the RAM 38.

When the selected program associated data DPS are supplied to the RAM 38, a writing control signal QWA is also supplied from the control unit 30 to the RAM 38. The selected program associated data DPS are written to be stored in the RAM 38 in response to the writing control signal QWA.

Then, a reading control signal QRA is supplied from the control unit 30 to the RAM 38 and thereby the selected program associated data DPS are read from the RAM 38 to be supplied to the control unit 30. In the control unit 30, the selected program associated data DPS read from the RAM 38 are supplied to the data selector. In the data selector, a specific portion of the selected program associated data DPS is extracted as specific associated data DPSS. The extraction of the specific associated data DPSS from the selected program associated data DPS is carried out by, for example, extracting a portion of the selected program associated data DPS having the quantity of data corresponding to 128 characters or less, which corresponds to a part between a pair of special marks, such as ( ), " " or 「 」, or double spaces in the information of 128 characters or less. The portion of the selected program associated data DPS, which corresponds to a part between a pair of special marks, such as ( ), " " or 「 」, or double spaces in the information of 128 characters or less is deemed to be closely related to the contents of the program information represented by the program associated data DPA and therefore useful to a user of the embodiment shown in FIG. 1. That is, in this case, the specific associated data DPSS extracted from the selected program associated data DPS is constituted by a portion of the program associated data DPA, which represents information useful to the user.

Then, the specific associated data DPSS extracted from the selected program associated data DPS to be constituted by the portion of the program associated data DPA, which represents the information useful to the user, is derived from the control unit 30 to the output terminal 39.

Figure 4:
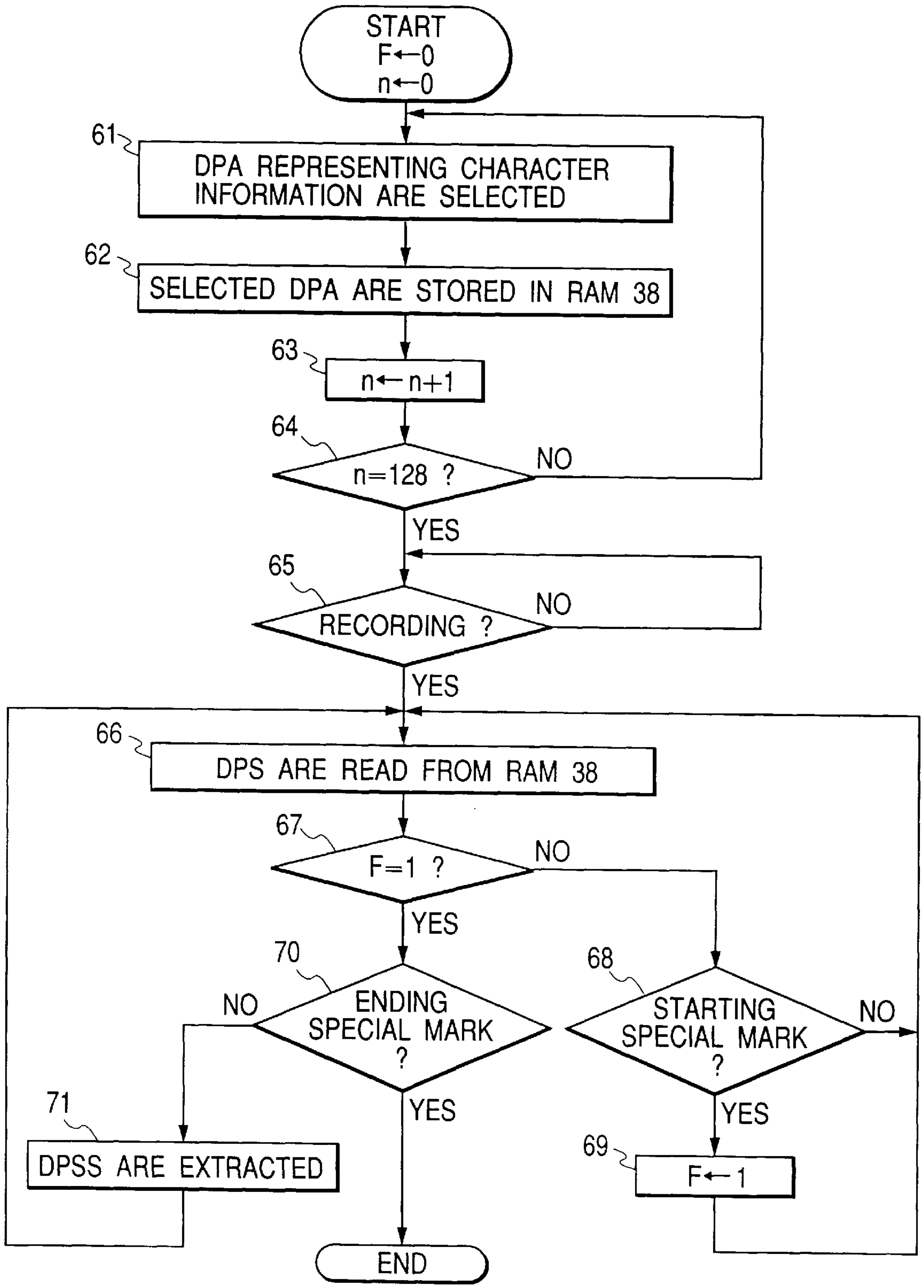
FIG. 4 is a flow chart showing an example of an operational program for microcomputer used in a control unit employed in the embodiment shown in FIG. 1.

FIG. 4 shows a flow chart representing an example of a control program which the control unit 30 carries out for storing the selected program associated data DPS in the RAM 38 temporarily and extracting the specific associated data DPSS from the selected program associated data DPS read from the RAM 38.

According to the flow chart shown in FIG. 4, a data extraction flag F is set to be "0" and n representing the number of times is set to be 0 at the start of the program. Then, in step 61, a portion of the program associated data DPA, which represents character information corresponding to a single character is selected, and in step 62, the portion of the program associated data DPA selected in the step 61 is stored in the RAM 38. Then, the n is increased by 1 in step 63.

In step 64, it is checked whether the n has reached 128 or not. If the n has not reached 128, the process returns to the step 61. When it is clarified in the step 64 that the n has reached 128, it is checked in step 65 whether the specific associated data DPSS should be recorded on a recording medium immediately or not. If the specific associated data DPSS should not be recorded on the recording medium immediately, the check in the step 65 is repeated. If the specific associated data DPSS should be recorded on the recording medium immediately, the process is advanced to step 66.

In the step 66, the selected program associated data DPS are read from the RAM 38, and in step 67, it is checked whether the data extraction flag F is "1" or not. If the data extraction flag F is not "1" but "0", it is checked in step 68 whether or not the selected program associated data DPS read from the step 66 represent a starting special mark, such as ( , "or ⌈. If the selected program associated data DPS read from the step 66 does not represent the starting special mark, as a result of the check in the step 68, the process returns directly to the step 66. When it is clarified in the step 68 that the selected program associated data DPS read from the step 66 represent the starting special mark, the data extraction flag F is set to be "1" in step 69 and the process returns to the step 66.

While it is clarified in the step 67 that the data extraction flag F is "1", it is checked in step 70 whether or not the selected program associated data DPS read from the step 66 represent an ending special mark, such as ) , "or ⌋. If the selected program associated data DPS read from the step 66 does not represent the ending special mark, as a result of the check in the step 71, the selected program associated data DPS read from the step 66 are extracted as the specific associated data DPSS to be provided for recording on the recording medium by the signal recording portion 12 and then the process returns to the step 66. When it is clarified in the step 70 that the selected program associated data DPS read from the step 66 represent the ending special mark, the process is terminated.

With such a control operation as carried out in accordance with the control program as shown in FIG. 4 , the specific associated data DPSS are derived from the control unit 30.

As described above, in the digital audio signal receiving portion 11 shown in FIG. 1, which constitutes the embodiment of apparatus for receiving broadcasting signals according to the present invention, the selected part of the program associated data DPA, which has the predetermined quantity of data, for example, the initial part of the program associated data DPA, which has the quantity of data corresponding to 128 characters are picked out to be stored in the RAM 38 as the selected program associated data DPS, and the portion of the selected program associated data DPS, which corresponds to the part between a pair of special marks, such as ( ), " " or ⌈ ⌋, or double spaces in the information of 128 characters and represents information useful to the user is extracted to be derived from the control unit 30 to the output terminal 39 as the specific associated data DPSS. Accordingly, the selected part of the program associated data DPA, which includes, for example, the portion of the program associated data DPA, which represents the information useful to the user, can be stored temporarily in or read from the RAM 38, which is able to have relatively small memory capacity, with improved data processing efficiency.

The reproduced audio signal SA obtained at the output terminal 29 of the digital audio signal receiving portion 11 is supplied to an input terminal 41 of the signal recording portion 12 connected to the output terminal 29 and the specific associated data DPSS obtained at the output terminal 39 of the digital audio signal receiving portion 11 are supplied to an input terminal 42 of the signal recording portion 12 connected to the output terminal 39.

In the signal recording portion 12, the reproduced audio signal SA from the input terminal 41 is supplied to a recording processor 43 and the specific associated data DPSS from the input terminal 42 are supplied to a control unit 44 forming an operation control portion. In the control unit 44, the specific associated data DPSS from the input terminal 42 are supplied to a data transmitting portion and then transmitted by the data transmitting portion from the control unit 44 to a RAM 45 constituting a memory portion.

When the specific associated data DPSS are supplied to the RAM 45, a writing control signal QWB is also supplied from the control unit 44 to the RAM 45. The specific associated data DPSS are written to be stored in the RAM 45 in response to the writing control signal QWB.

Then, a reading control signal QRB is supplied from the control unit 44 to the RAM 45 in accordance with a command signal CXB supplied to the control unit 44 from an input portion 46 in response to manual operations thereto and the specific associated data DPSS are read from the RAM 45 in response to the reading control signal QRB to be supplied to the control unit 44. In the control unit 44, the specific associated data DPSS read from the RAM 45 are supplied to the data transmitting portion and then transmitted by the data transmitting portion from the control unit 44 to a recording processor 47.

Further, control signals CAR and CPR from the control unit 44 are supplied to the recording processors 43 and 47, respectively, and the recording processors 43 and 47 are put in operation in response to the control signals CAR and CPR. As a result, a recording audio signal SAR based on the reproduced audio signal SA from the input terminal 41 is obtained from the recording processor 43 and a recording associated signal SPR based on the specific associated data DPSS from the control unit 44 is obtained from the recording processor 47. The recording audio signal SAR from the recording processor 43 and recording associated signal SPR from the recording processor 47 are supplied to a signal multiplexer 48.

The recording audio signal SAR and recording associated signal SPR are multiplexed to produce a recording signal SAP in the signal multiplexer 48 and the recording signal SAP obtained from the signal multiplexer 48 is supplied to a recording portion 49. A control signal CRE is supplied also to the recording portion 49 from the control unit 44 and the recording portion 49 is put in operation in response to the control signal CRE.

Consequently, in the recording portion 49, the recording signal SAP which is produced by multiplexing the recording audio signal SAR and recording associated signal SPR is recorded on a recording medium, such as a writable optical disc or the like. That is, in the recording portion 49, the recording associated signal SPR based on the specific associated data DPSS derived from the control unit 30 in the digital audio signal receiving portion 11 is recorded on the recording medium to accompany the recording audio signal SAR based on the reproduced audio signal SA obtained from the D/A convertor 27 in the digital audio signal receiving portion 11. The recording medium on which the recording signal SAP which is produced by multiplexing the recording audio signal SAR and recording associated signal SPR has been recorded is obtained to be detachable from the signal recording portion 12.

The operational condition of the control unit 44 in response to the command signal CXB from the input portion 46 is displayed on a display portion 50 to which a displaying signal SDB is supplied from the control unit 44.

In the structure comprising the digital audio signal receiving portion 11 and the signal recording portion 12 as shown in FIG. 1, which constitutes the embodiment of apparatus for receiving broadcasting signals and recording signals based on the received broadcasting signal according to the present invention, the selected part of the program associated data DPA, which includes, for example, the portion of the program associated data DPA, which represents the information useful to the user, can be stored temporarily in or read from the RAM 38, which is able to have relatively small memory capacity, with improved data processing efficiency, and the portion of the program associated data DPA extracted from the selected part of the program associated data stored temporarily in the memory device, can be recorded on the recording medium together with the reproduced audio signal.

What is claimed is:

1. An apparatus for receiving broadcasting signals comprising:

a tuning portion for receiving selectively digital audio broadcasting signals, a first decoding portion for producing information data based on a digital audio broadcasting signal received by said tuning portion, a second decoding portion for decoding the information data from said first decoding portion to produce a digital audio signal and associated data accompanying the digital audio signal, a memory portion in which the associated data are stored and from which the stored associated data are read, and an operation control portion for controlling said memory portion to store a selected part of the associated data from said second decoding portion, which includes a predetermined quantity of data, in said memory portion, and to read from said memory portion the selected part of the stored associated data, and for extracting a predetermined portion of the associated data from the selected part of the associated data read from said memory portion wherein the predetermined portion of the associated data extracted by said operation control portion is a program information portion of the associated data which represents selected program information in the selected part of the associated data read from said memory portion, the program information portion of the associated data which represents the selected program information extracted by said operation control portion corresponds to a part between marks representing a partition of data in the selected part of the associated data read from the memory portion, and the part between marks representing the partition of data corresponding to the program information portion extracted by said operation control portion is a part between a pair of special marks or double spaces in the selected part of the associated data read from the memory portion.

2. An apparatus for receiving broadcasting signals according to claim 1, wherein said operation control portion controls said memory portion to store an initial part of the associated data from said second decoding portion, which includes the predetermined quantity of data, in said memory portion as the selected part of the associated data.

3. An apparatus for receiving broadcasting signals according to claim 2, wherein the initial part of the associated data which is stored in said memory portion by said operation control portion has a quantity of data corresponding to 128 characters or less.

4. An apparatus for receiving broadcasting signals according to claim 1, wherein said first decoding portion demodulates a digital intermediate frequency signal based on the digital audio broadcasting signal received by said tuning portion to produce audio information data and service information data, and supplies the audio information data and service information to means for program selection processing, time de-interleaving arrangements and error correction processing for producing information data which contain the audio information data and service information data.

5. An apparatus for receiving broadcasting signals according to claim 4 further comprises a third decoding portion for processing the service information data from said first decoding portion to produce reproduced service data.

6. An apparatus for receiving broadcasting signals according to claim 1, wherein said second decoding portion decodes audio information data obtained from said first decoding portion to produce the digital audio signal and the associated data accompanying the digital audio signal.

7. An apparatus for receiving broadcasting signals according to claim 6 further comprises a digital to analog converting portion for converting the digital audio signal from said second decoding portion to a reproduced audio signal.

8. An apparatus for receiving broadcasting signals according to claim 1 further comprises an input portion and a display portion connected to said operation control portion, wherein said operation control portion produces control data based on a command signal from said input portion which are supplied to said first and second decoding portions, and an operational condition of said operation control portion, in response to the command signal from said input portion, is displayed on said display portion.

9. An apparatus for receiving broadcasting signals according to claim 1, wherein the part between marks representing the partition of data in the selected part of the associated data read from the memory portion comprises information of 128 characters or less.

10. A method of writing data in and/or reading data from a memory device in a broadcasting signal receiving apparatus, which comprises the steps of:

receiving selectively digital audio broadcasting signals, producing information data based on the received digital audio broadcasting signal, decoding the information data produced based on the digital audio broadcasting signal to produce a digital audio signal and associated data accompanying the digital audio signal, extracting the associated data, storing a selected part of the extracted associated data, which includes a predetermined quantity of data from an initial part of the associated data, in a memory device, reading the stored, selected part of the associated data from said memory device, and extracting a predetermined portion of the associated data from the selected part of the associated data read from said memory device, wherein the predetermined portion of the associated data corresponds to a part between marks representing a partition of data, and the part between marks representing the partition of data is a part between a pair of special marks or double spaces.

11. A method according to claim 10, wherein the selected part of the associated data which includes the predetermined quantity of data from the initial part of the associated data includes a quantity of data corresponding to 128 characters or less.

12. An apparatus for receiving broadcasting signals and recording signals based on the received broadcasting signals comprising;

a tuning portion for receiving selectively digital audio broadcasting signals, a first decoding portion for producing information data based on a digital audio broadcasting signal received by said tuning portion, a second decoding portion for decoding the information data from said first decoding portion to produce a digital audio signal and associated data accompanying the digital audio signal, a memory portion in which the associated data are stored and from which the stored associated data are read, an operation control portion for controlling said memory portion to store a selected part of the associated data from said second decoding portion, which includes a predetermined quantity of data, in said memory portion, and to read from said memory portion the selected part of the associated data stored in said memory portion, and for extracting a predetermined portion of the associated data from the selected part of the associated data read from said memory portion, and a signal recording portion for producing recording associated data based on the predetermined portion of the associated data extracted by said operation control portion and recording the recording associated data on a recording medium, wherein the predetermined portion of the associated data extracted by said operation control portion is a program information portion of the associated data which represents selected program information in the selected part of the associated data read from the memory portion, the program information portion of the associated data which represents selected program information extracted by said operation control portion corresponds to a part between marks representing a partition of data in the selected part of the associated data read from said memory portion, and the part between marks representing the partition of data corresponding to the program information extracted by said operation control portion is a part between a pair of special marks or double spaces in the selected part of the associated data read from said memory portion.

13. An apparatus according to claim 12, wherein the selected part of the associated data stored in said memory portion by said operation control portion is an initial part of the associated data from said second decoding portion, which includes a predetermined quantity of data.

14. An apparatus according to claim 13, wherein the initial part of the associated data includes a quantity of data corresponding to 128 characters or less.

15. An apparatus according to claim 12, wherein said signal recording portion produces a recording audio signal based on the digital audio signal from said second decoding portion and records the recording audio signal on the recording medium together with the recording associated data.

16. An apparatus according to claim 12, wherein said signal recording portion comprises an additional memory portion or storing the predetermined portion of the associated data extracted by said operation control portion and from which the stored, predetermined portion of the associated data is read, a recording processing portion for producing the associated data read from said additional memory portion, a recording portion for recording the recording associated data on the recording medium, and an additional operation control portion for controlling said additional memory portion to store the predetermined portion of the associated data extracted by said operation control portion in said additional memory portion, and read the stored, predetermined portion of the associated data from said additional memory portion, and for supplying said recording processing portion with the stored, predetermined portion of the associated data read from said additional memory portion.

17. An apparatus according to claim 15, wherein said signal recording portion comprises an additional memory portion for storing the predetermined portion of the associated data extracted by said operation control portion and from which the specific portion of the associated data is read, a first recording processing portion for producing the associated data based on the predetermined portion of the associated data from said additional memory portion, a second recording processing portion for producing the recording audio signal based on the digital audio signal from said second decoding portion, a recording portion for recording the recording audio signal on the recording medium, and an additional operation control portion for controlling said additional memory portion to store the predetermined portion of the associated data extracted by said operation control portion in said additional memory portion, and to read the stored, predetermined portion of the associated data from said additional memory portion, and for supplying said first recording processing portion with the stored, predetermined portion of the associated data read from said additional memory portion.

18. An apparatus according to claim 12, wherein the part between marks representing the partition of data in the selected part of the associated data read from the memory comprises information of 128 characters or less.

* * * * *